(12) United States Patent
Bayne

(10) Patent No.: US 8,397,434 B2
(45) Date of Patent: Mar. 19, 2013

(54) GREENHOUSE INSULATION SYSTEM

(76) Inventor: David Bayne, Kentville (CA)

( * ) Notice: Subject to any disclaimer, the term of this patent is extended or adjusted under 35 U.S.C. 154(b) by 501 days.

(21) Appl. No.: 12/556,154

(22) Filed: Sep. 9, 2009

(65) Prior Publication Data

US 2010/0058672 A1 Mar. 11, 2010

Related U.S. Application Data

(63) Continuation-in-part of application No. 11/546,856, filed on Oct. 12, 2006, now abandoned.

(30) Foreign Application Priority Data

Mar. 28, 2006 (CA) .................................. 2541139

(51) Int. Cl.
*A01G 9/00* (2006.01)
*A01G 13/02* (2006.01)
*A47H 1/00* (2006.01)
*E04B 1/34* (2006.01)
*E04G 11/04* (2006.01)
*E04H 15/20* (2006.01)

(52) U.S. Cl. ............... 52/2.11; 47/17; 47/20.1; 47/32.1; 160/29; 52/3; 52/5

(58) Field of Classification Search ................... 52/2.11, 52/3, 5, 198, 218, 396.03, 396.06; 47/17, 47/20.1, 22.1, 32.1; 160/29, 84.01
See application file for complete search history.

(56) References Cited

U.S. PATENT DOCUMENTS

| | | | |
|---|---|---|---|
| 1,950,316 A | 10/1932 | Lorenz | |
| 2,874,612 A | 3/1956 | Luboshez | |
| 3,140,563 A | 7/1964 | Allen | |
| 3,359,687 A | 12/1967 | Wallace | |
| 3,985,116 A | 10/1976 | Kapany | |
| 4,095,369 A | 6/1978 | Posnansky et al. | |
| 4,128,307 A | 12/1978 | Badertscher et al. | |
| 4,290,242 A | 9/1981 | Gregory, Jr. | |
| 4,297,813 A * | 11/1981 | Farrell et al. | 52/2.17 |
| 4,301,626 A | 11/1981 | Davis et al. | |
| 4,352,259 A | 10/1982 | Smith et al. | |
| 4,577,436 A | 3/1986 | Dalle | |
| 4,672,888 A | 6/1987 | Crombie et al. | |
| 5,265,373 A | 11/1993 | Vollebregt | |
| 5,335,447 A | 8/1994 | Bee | |
| 5,655,335 A | 8/1997 | Vermeer | |
| 6,000,170 A | 12/1999 | Davis | |
| 6,024,153 A | 2/2000 | Goldman | |
| 6,223,476 B1 | 5/2001 | Lemoine | |
| 6,260,308 B1 | 7/2001 | Looney | |
| 6,442,903 B1 | 9/2002 | Hebert | |
| 6,536,157 B2 * | 3/2003 | Wijbenga | 47/17 |
| 6,832,448 B2 * | 12/2004 | Stefan | 47/17 |
| 6,986,938 B2 | 1/2006 | Day et al. | |
| 7,094,144 B2 | 8/2006 | Dubé | |

(Continued)

FOREIGN PATENT DOCUMENTS

WO WO 2007/000220 1/2007

OTHER PUBLICATIONS

Written Opinion of the International Search Report Authority for International Application No. PCT/2007/000220, 5 pages (mailing date of May 28, 2007).

*Primary Examiner* — Andrew Triggs
(74) *Attorney, Agent, or Firm* — Patterson Thuente Pedersen, P.A.

(57) ABSTRACT

An insulation system for installation between a floor and a roof of a greenhouse includes an insulation module with insulating panels shiftable between an open position and a closed position for controlling air flow and heat flow in the greenhouse.

15 Claims, 7 Drawing Sheets

U.S. PATENT DOCUMENTS

| | | |
|---|---|---|
| 7,357,710 B2 | 4/2008 | Dubé |
| 2004/0003536 A1 | 1/2004 | Stefan |
| 2007/0204526 A1 | 9/2007 | Davidson |
| 2007/0227530 A1* | 10/2007 | Bayne .......................... 126/621 |
| 2010/0058672 A1* | 3/2010 | Bayne .......................... 52/2.11 |

* cited by examiner

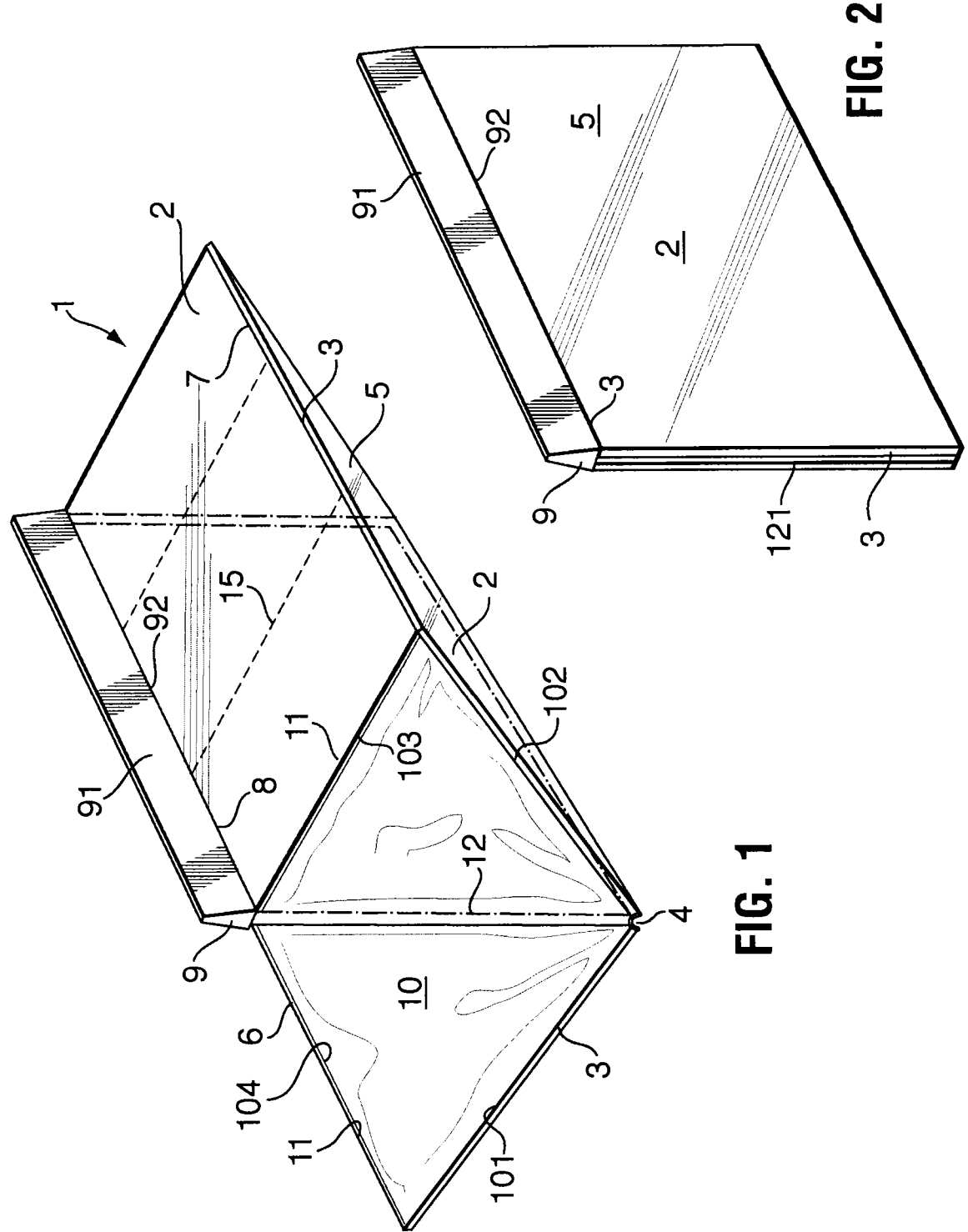

GREENHOUSE INSULATION SYSTEM

RELATED APPLICATION

This application is a continuation-in-part of application Ser. No. 11/546,856 filed Oct. 12, 2006, which in turn claims priority to Canadian Application No. 2,541,139 filed Mar. 28, 2006, each of which is hereby fully incorporated herein by reference.

TECHNICAL FIELD

The present invention relates to the field of greenhouses and controlled environment agriculture (CEA).

BACKGROUND OF THE INVENTION

Generally speaking, a greenhouse is a building constructed for the practice of indoor horticulture or agriculture. Traditionally, the walls and roofs of greenhouses have been constructed of glass or similar transparent material such as transparent plastic panels. This permits sunlight to directly illuminate plants, and permit them to grow. Systems have been proposed, for instance as shown in U.S. Pat. No. 5,655,335 to allow the roof of a traditionally constructed transparent greenhouse to open to permit the plants being grown therein to become hardier, thereby increasing the success rate of transplants from the greenhouse to a natural environment. In U.S. Pat. No. 5,655,335, longitudinally extending roof panels are paired together in v-shaped pairs that extend the length or width of a greenhouse. Each arm of the 'V' slantingly abuts the 'V' next to it, to define a series of peaks running the length or width of the greenhouse. Each 'V' shaped pair of panels is hinged together at the base of the 'V' and provided with mechanical means to draw the arms of the 'V' inward. It will be understood, then, that when one or more V shaped pairs is closed up in this way, the roof will be opened, and the natural atmosphere permitted to circulate in the open greenhouse.

It is, moreover, known to use a plurality of inflatable tubes, arranged parallel to each other to construct an insulating partition in a greenhouse. In U.S. Pat. No. 4,290,242 (Gregory), inflatable clear polyethylene tubes are arranged in longitudinal lines in a greenhouse to provide an insulating layer. The tubes are inflated to lean against each other and provide a continuous insulating ceiling structure when there is no sunlight, and deflated to hang vertically and provide passages between the tubes when the sun is shining.

A similar system is shown in U.S. Pat. No. 4,352,259 (Smith et al.), which also provides that the ends of the longitudinally extending tubes are mounted on racks, whereby the tubes may be drawn to the side of the greenhouse. Other patents that show the use of insulating structures made up of parallel inflatable tubes can be seen in U.S. Pat. No. 4,301,626 (Davis et al.), U.S. Pat. No. 600,171 (Davis) and U.S. Pat. No. 6,442,903 (Herbert).

SUMMARY OF THE INVENTION

The present invention, therefore, provides a greenhouse insulation system that has, at its core, a novel retractable insulation module for use in a greenhouse. Each module has a pair of rectangular light-weight insulating panels that are hinged together along a common lower edge. The panels can be pulled together to permit air flow, and heat flow, between the panels, preferably by means of a bellows created by joining the remaining edges of the panels by means of a gas impermeable membrane, and selectively inflating or deflating the bellows defined by the panels and the membranes. Alternatively, the panels may be opened or closed by means of cables, wires, a rack and pinion system, or any other mechanical means, as will be obvious to one skilled in the art. An air space is provided in the greenhouse between the insulated ceiling panels of the present invention, and the roof (which may be transparent or translucent), of the greenhouse. It will be understood, moreover, that the present invention is applicable to any building having roof glazing. Therefore, as used herein the word 'greenhouse' should be interpreted to mean any building with areas of roof glazing in which it may be desired to install the system of the present invention.

The downwardly facing surfaces of the insulating panels of the present invention will ideally be coated with a reflective material, which will maximize the efficiency of the natural light reaching the plant canopy in the greenhouse.

In a broad aspect, then, the present invention relates an insulation system for installation in a greenhouse between a floor of the greenhouse, and a roof thereof, for assisting in the control of air flow between a first space from the floor of the greenhouse and said insulation system, and a second space from the insulation system to the roof of the greenhouse, comprising at least one insulation module adapted to be mounted at a level defining an interior ceiling of the greenhouse, and means to shift said at least one module between a closed position and an open position, whereby when said at least one module is closed, air below said at least one module remains in said first space of said greenhouse below said at least one module, and when said at least one module is open, air below said at least one module can move to said second space in said greenhouse above said at least one panel.

In another broad aspect, then, the present invention relates to a selectively operable ceiling panel for use in a greenhouse, comprising a bellows defined by a pair of longitudinally extending insulation panels hinged together along a common lower edge, and joined together along their end and upper edges by an air-tight membrane to define a bellows the evacuation of which will cause said panels to move together. The panels will remain in this vertical position until the air is no longer being evacuated, at which time the panels will spread apart.

BRIEF DESCRIPTION OF THE DRAWINGS

In drawings that illustrate the present invention by way of example:

FIG. 1 is a perspective view partly in phantom of a collapsible insulation panel module according to the present invention, in its closed condition;

FIG. 2 is a perspective view a collapsible insulation panel module of FIG. 1, in its open condition;

Figure 3:
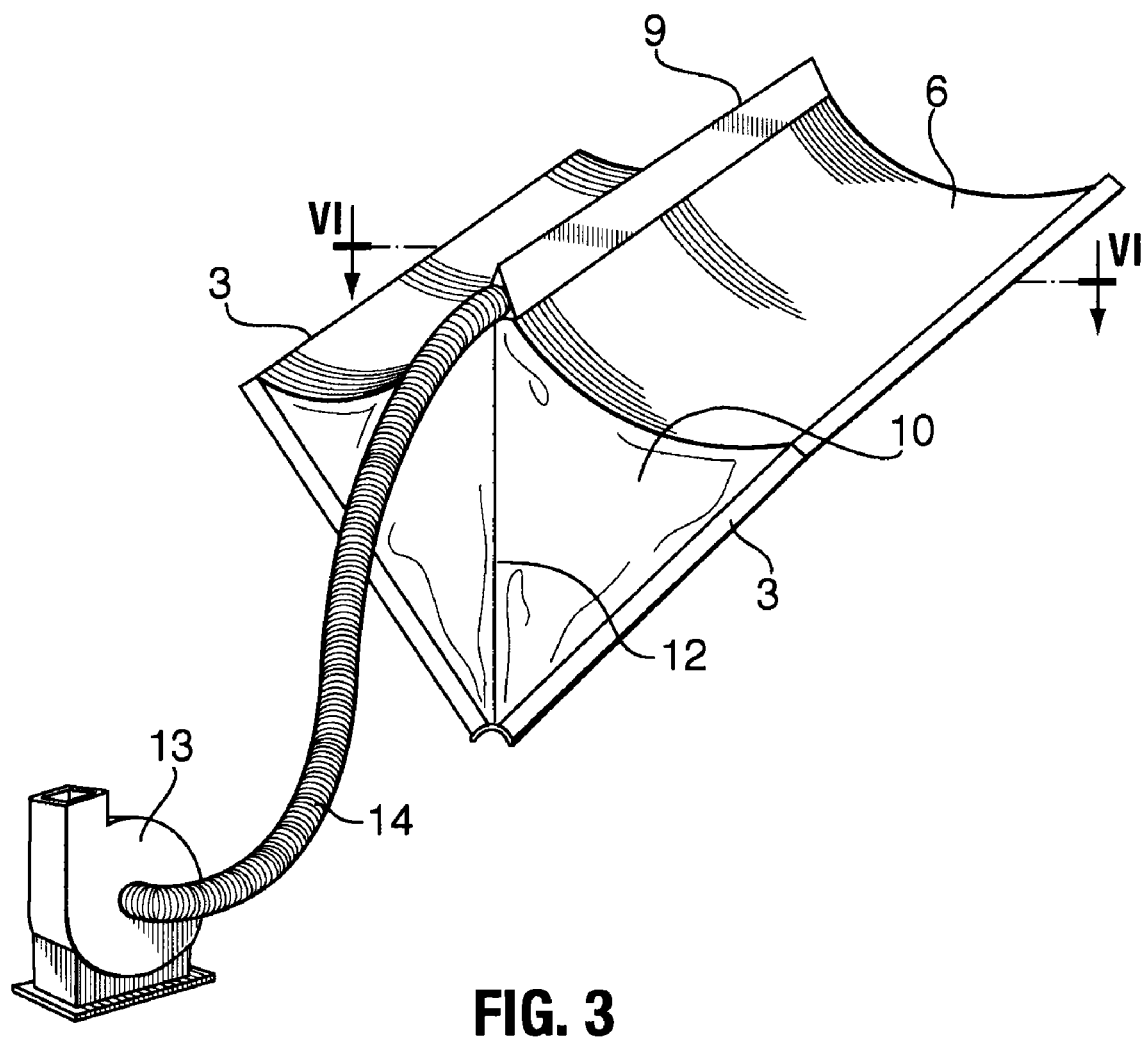
FIG. 3 is a perspective view of a panel module attached to either a fan or an air blower.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE INVENTION

Referring now to FIGS. 1 to 3, the basic collapsible insulation module 1 of the present invention is illustrated. It comprises a pair of hinged-together lightweight rigid insulating panels 2. A preferred material for the panels 2 is rigid foam, although other appropriate materials, which will result in a rigid insulated wall, will be obvious to one skilled in the art. For instance, the panels 2 may be fabricated as a thin box with a lightweight rigid frame, and upper and lower walls of stiff, lightweight plastic sandwiching a layer of fibreglass insulation.

Polyisocyuranate foam panels of between one and two inches in thickness are used in a preferred embodiment of the present invention. Each panel 2 will be framed around its perimeter, and, at spaced intervals, with ribs extending between the top and bottom edges of the panels 2 with a lightweight frame 3 of a rigid material such as aluminum, steel, extruded plastic, wood or the like. The function of the framework 3 is to provide rigidity against bending forces which will be encountered during a normal operation as well as those which may accidentally be encountered, for instance during installation. Moreover, the perimeter frame will serve as a mounting surface for hinges 4 that are provided at the lower edges of the panels 2, to hinge them either to a center support wall/structure or together.

It will be understood, moreover, that references herein to the lower edge of the panels 2 are for convenience, and reference to the illustrated embodiments of FIGS. 1 to 6 only. It is entirely feasible to construct other embodiments of the invention in such a way that the panels 2 are hinged to each other or to a center support wall/structure along their upper longitudinal edges. If, for instance, one wished to have the default position of the panels 2 to be folded into the center, hanging them with the hinges along with the top edge may be appropriate. Furthermore, since it will be understood that the panels 2 may be opened and closed by any means selected by one skilled in the art, it will be understood that in regard to some means of opening and closing, hanging the modules 1 with the hinges along the top edge will be appropriate.

The outer surfaces of the panels 2 are preferably provided with a layer of light reflecting material 5. This may be, for instance, a layer of reflective aluminum foil, or it may be a coating of white paint. This reflective layer 5 will maximize the light directed downwardly toward the plants being grown in the facility, and, if reflective aluminum is used, results in an increased insulation value for the insulated panels 2 by acting as a radiant heat barrier.

Figure 6:
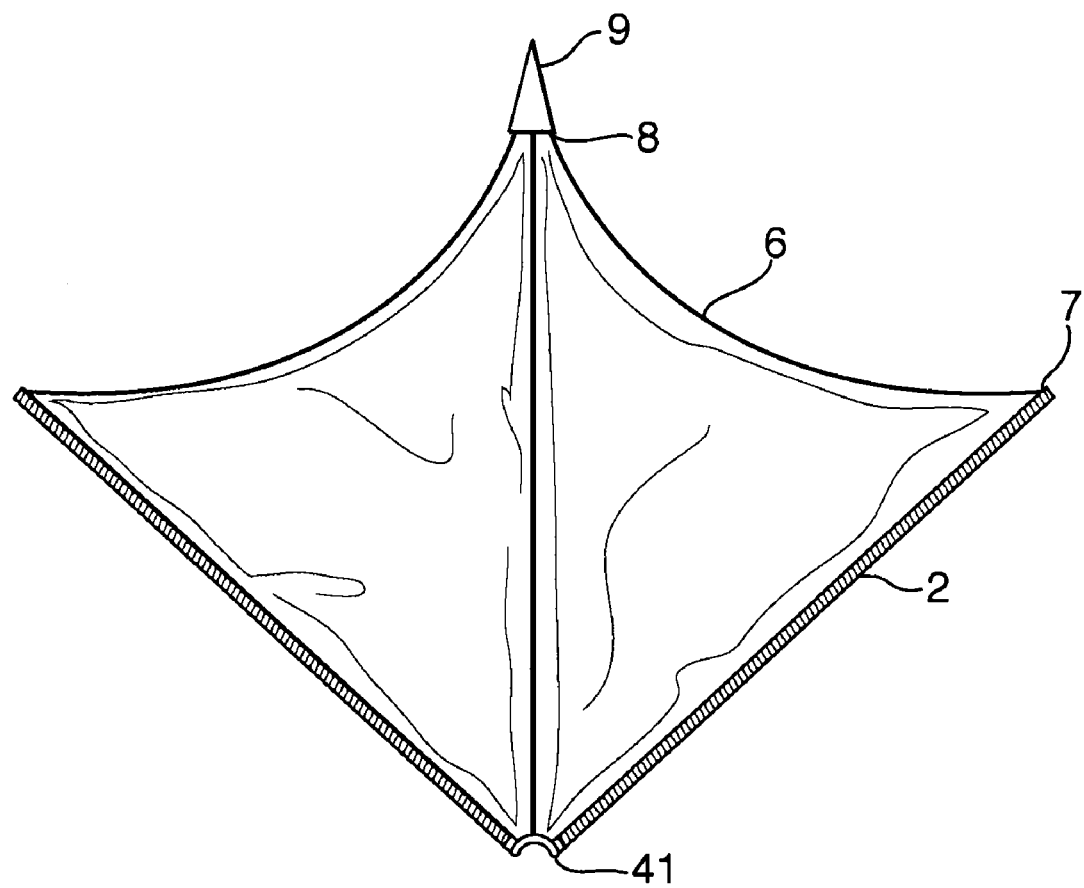
FIG. 6 is a cross-section, through line VI-VI in FIG. 3.
Figure 7:
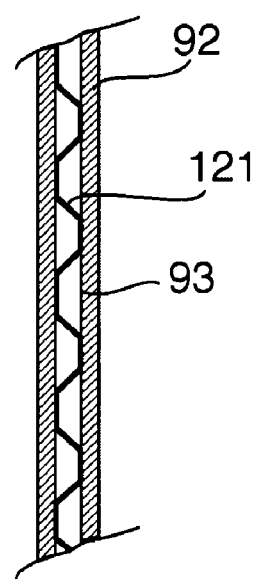
FIG. 7 is a detail view of the bottom panel of a plenum, in place.
Figure 8:
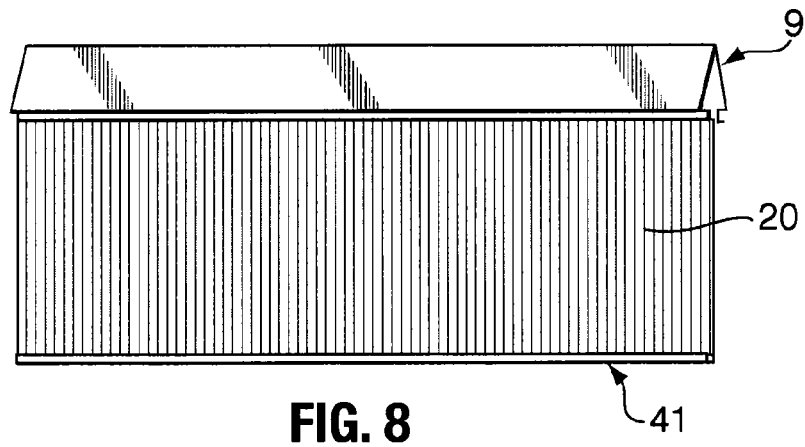
FIG. 8 is a front view of a preferred form of central supporting structure according to the present invention.

The two panels 2 in each module 1 are joined around their perimeter to each other by means firstly of the hinges 4 that extend along and join the lower edges of the panels 2 to the lowermost edge of a supporting structure 12, a short section of which is shown in phantom in FIG. 1, and by a series of flexible sheets that define a bellows arrangement around the remaining perimeter. The bellows consists of two congruent upper flexible membranes 6 that are rectangular. Each upper membrane is joined along its lower edge 7 to an upper edge of a panel 2, and along its upper edge 8 to the marginal edge of a longitudinally extending plenum 9, as shown in FIGS. 3, 6, and 7. Plenum 9 is mounted at the top edge of a central support member 12, and consists of a longitudinally extending box-like structure connected at one or more points along its width to ducting 14. The plenum 9 may be arched, rectangular, square, or any other desired shape, but is preferably substantially prism shaped, as shown in FIG. 6, and the outer side surfaces 91 are either coated with or constructed from light-reflective material such as light gauge metal to reflect light into the greenhouse. The lowermost panel 92 of the plenum is a horizontally oriented wall with an air distribution channel 93 or channels formed in it. In the embodiment illustrated in FIG. 7, air channel 93 is a longitudinal slot, and the lower panel 92 is aligned with the top longitudinal edge 121 of a central support structure 12. Central support structure 12 is preferably a corrugated web 20 (see FIG. 8) constructed from steel, aluminum, fibreglass, or any other rigid material (the selection of which will be a matter of choice to one skilled in the art). The corrugations function to strengthen the structure 12, and also to distribute air entering the plenum evenly into both sides of the module. It will be understood, then, that all edges, connection to membrane 6, and connections between the plenum 9 and central support will be airtight.

Moreover, it will be understood that central support 12, with plenum 9 and an associated lower chord 41 which may be a C-shaped metal cap to which hinges 4 are connected will effectively function as a truss structure, strengthening the overall rigidity of the greenhouse, and serving as a rigid member from which to hang the modules 1 in place.

Figure 9:
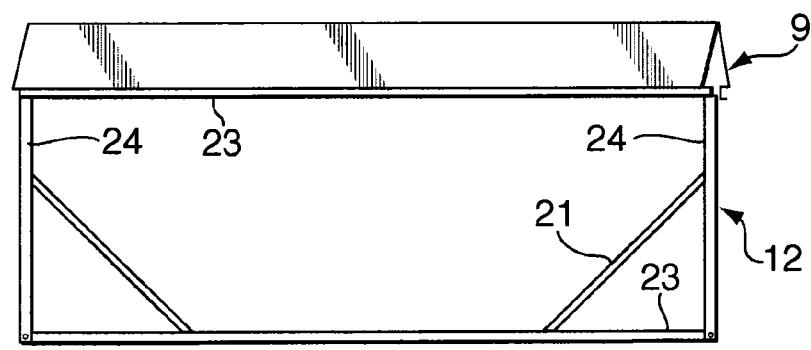
FIG. 9 is a front view of an alternate form of central support structure according to the present invention.
Figure 10:
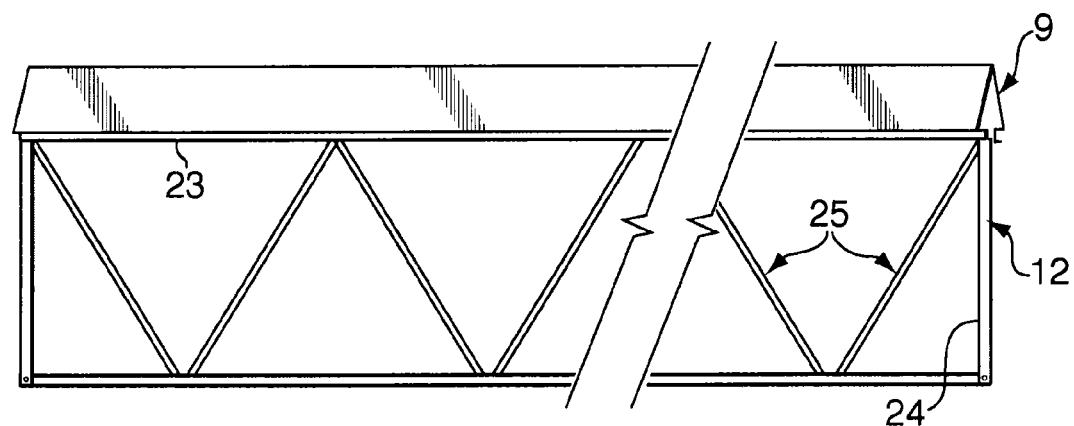
FIG. 10 is a front view of another alternate form of central support structure according to the present invention, shown as being indefinite length.
Figure 11:
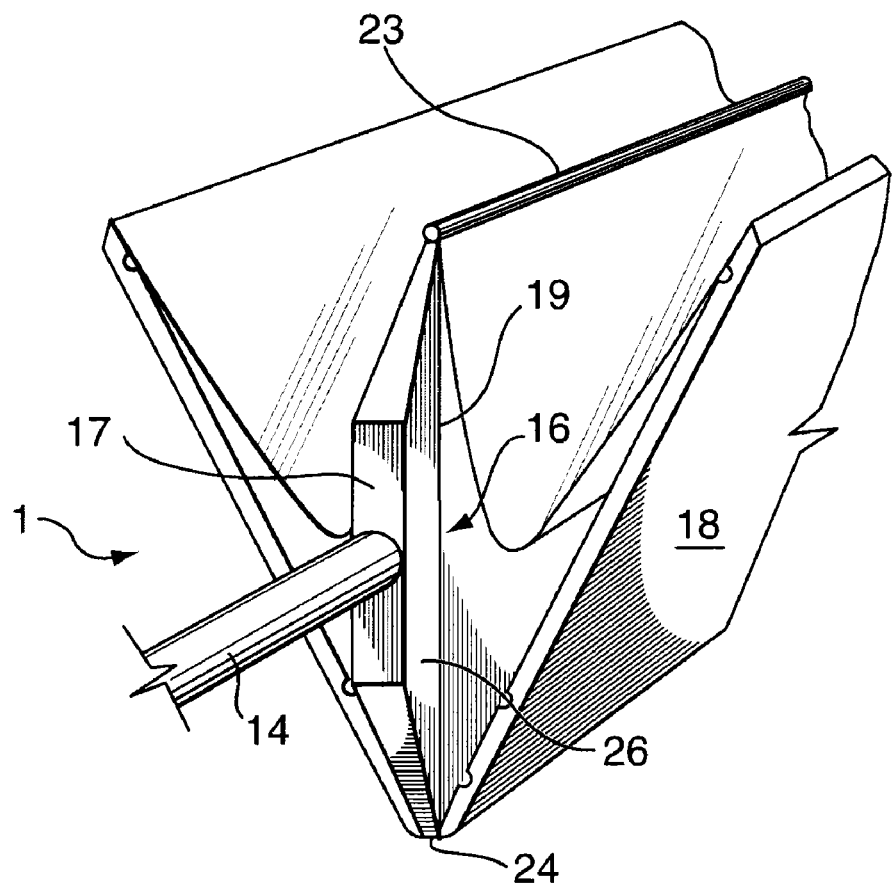
FIG. 11 is a perspective view of an alternate embodiment of a collapsible insulation panel module according to the present invention, in partly open condition.

It will be further understood that although a corrugated central support structure 12 has been described and illustrated as a preferred method of facilitating even air distribution, and therefore balanced opening and closing of the modules 1, other means of distributing air evenly, such as independent air ducts into each side of a module 1, each duct being provided with a pressure regulation valve, are possible. Moreover, the modules may be unevenly weighted, whereby the lighter weight panel 2 will consistently be lifted first, resulting in consistent opening and closing characteristics. Alternatively, the panels 2 may be opened and closed mechanically, by wires or a rack and pinion or a pantograph or scissors arrangement. Two alternate forms of central support structure 12 are shown in FIGS. 9 and 10. In FIG. 9, the central support structure is illustrated as an open framework with top and bottom frame members 23, spaced apart by end frame members 24, and braced by corner braces 21. The frame members 23, 24 and corner braces 21 are fabricated from steel, aluminum, fibreglass, carbon fibre or any other appropriate lightweight material, as will be a matter of choice to one skilled in the art.

In FIG. 10, a central support structure that is designed to also function as a truss is shown. In this embodiment, the top and bottom frame members 23, as well as the plenum 9 and end frame member 24 are constructed from heavier gauge metal, so as to allow the plenum 9 to function as a chord in the truss, and effectively become a structural component in the greenhouse frame. A continuous series of diagonal braces 25 are provided between the top and bottom frame members, to increase the rigidity of the truss.

The edges of the panels 2 are joined together by end membrane 10 that each are generally square or "diamond" shaped, and joined along their edges 101, 102, 103, 104 to each panel 2 and the end edges 11 of upper membrane 6. End membranes 10 are formed by folding the flexible membrane at the end of the membranes, 6, and continuing said membrane along the end "wall" to result in the end "triangles". This end triangle is then sealed to the end of the center wall structure/support and the end edge of the insulated panels, as shown in FIG. 1, with each triangular piece being joined to the vertical edge of support structure 12. To ensure that the end membranes 10 are well sealed to the ends of support structure 12, a vertical trim piece may be applied over the membrane 10, along the end edge of support structure 12, and fastened thereto with screws, rivets, or other suitable fasteners.

It will be understood, moreover, that at all seams between flexible membranes and panels, an air-tight seal is formed, by the use of suitable adhesives and/or sealants. Furthermore, it will also be noted that the longitudinal hinge 4 between the two panels 2 will also be substantially air-tight. In this regard, a membrane (not shown) may be adhesively applied, or mechanically sealed, to the longitudinal joint between the panels 2 along the lower edge of support structure 12, either inside or outside the hinge 4. Alternatively, the hinge 4 may be constructed from an air impermeable material such as strips of rubber attached to the lower edges of the insulated panels and support wall.

Referring now to FIG. 3, it will be seen that a fan or blower 13, or other air-flow apparatus, is connected by means of plenum 9 or manifold above the central support structure 12. When air is evacuated from the module 1, it collapses to an open position, as shown in FIG. 2. When the airflow evacuating the module is discontinued, gravity results in the insulated panels "falling" to their horizontally inclined closed position, drawing air back into the module during this process. At their closed, inclined position, the panels will preferably be supported by wires 15 (or cables, straps or the like) inside the modules (as shown in FIG. 1, in phantom), extending from the central support 12 to the upper edge of the panel 3. The function of this wire 15 is to ensure that the module will consistently fall to the correct position, without stress being placed on the plastic material of the membranes.

Figure 4:
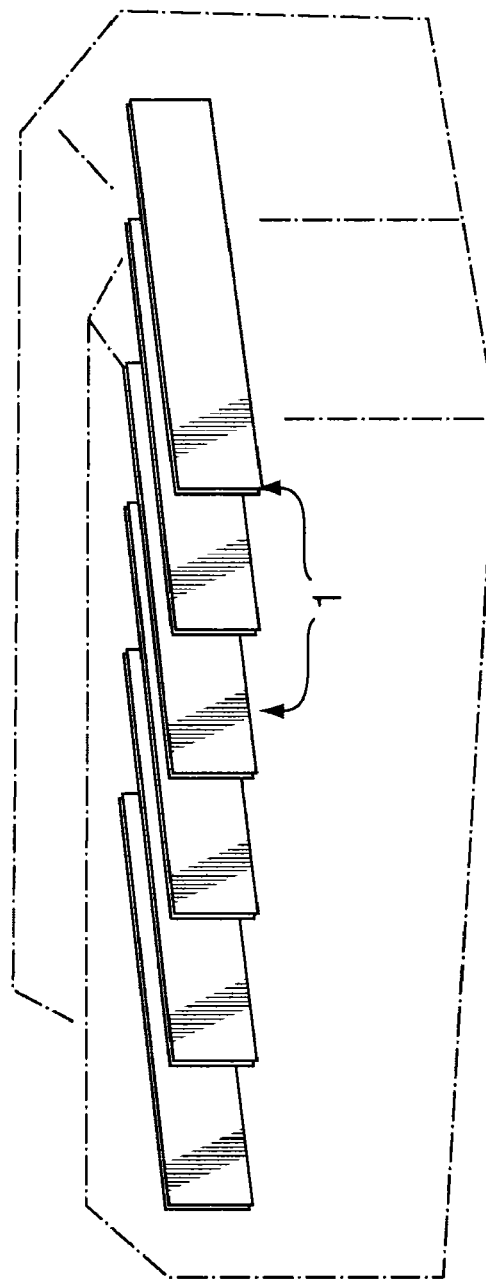
FIG. 4 is a perspective schematic view of a series of modules, in open condition.
Figure 5:
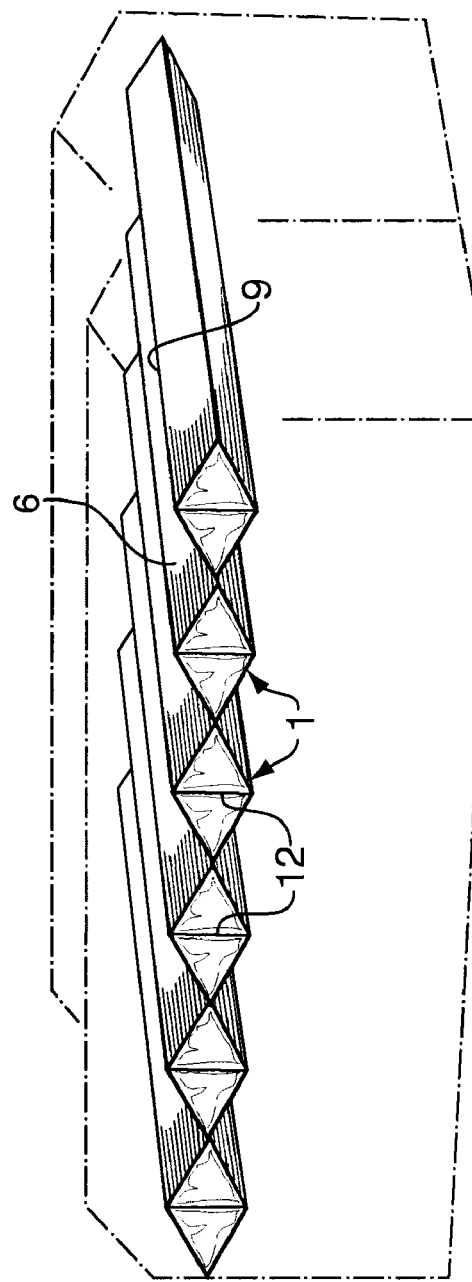
FIG. 5 is a similar view to that of FIG. 4, with the modules in closed condition.

As seen in FIGS. 4 and 5, a series of modules can be mounted in a building, hung from the ceiling thereof. It will be understood that the modules must be arranged in parallel rows, and spaced apart such that, as shown in FIG. 5, when the modules are in closed position, the edges of adjacent modules, as well as the contiguous ends of the modules which form the rows, will meet in a substantially air tight manner. The air tightness is substantially improved through the use of gasket seals. In this regard, it should be noted that it is not necessary for edge to edge contact of adjacent modules, or end to end contact of the panels forming a row, to be absolutely airtight. It is desirable, however, to prevent large airflows, and heat flows from the space below the modules to the space above the modules 1.

In their closed position, as shown in FIG. 5, the lateral edges of the module define a continuous zig-zag shaped edge on each side of the modules 1. Accordingly, it is desirable that the building into which the modules 1 are fitted be provided with a complementary perimeter margin, so that the lateral side edges of the panels can also be sealed, with respect to the walls of the building, against air and heat flow. It will also be understood that it is not necessary to provide a blower or fan 13 in connection with each module. If a remotely located blower/fan air flow apparatus is provided, it may be connected by duct work to a plurality of modules 1, to open and close them in groups.

An alternate embodiment of the collapsible insulation panel of the present invention is shown in FIGS. 11-15. In the alternate embodiment, the plenum 16 is located at the end of the collapsible panel module 1. Plenum 16 is substantially wedge shaped, with a broad portion 17 remote from panels 18, connected to air duct 14.

The plenum in this embodiment has walls 26 that converge to a narrow opening 19 adjacent panels 18 of the module 1. Each panel is preferably constructed of a rigid foam insulation. The panels 18 are hinged together along their lowermost edges by a rod 24 that defines the lower cord of a truss central support structure 12 such as that described in relation to FIG. 10. Each panel 18 is provided with a longitudinal groove 27 spaced from its upper edge, so that in a fully open position (i.e., with the panels fully drawn in) the panels will accommodate upper frame member 23 of the central support, and be separated only by the width of diagonal braces 25 and end members 24. Diagonal braces 25 and end members 24 are not as wide as upper frame member 23.

Panels 18 are also provided with one ore more additional longitudinal grooves 28 so that as air is evacuated from the space between the panels 18, the panels will come to lie flat against braces 25 and end members 24.

It will be appreciated, then, that the module 1 shown in FIGS. 11-15 may be advantageous over that shown in FIG. 1 in at least two respects. First, the insulation panels can be brought together so that the module, in its 'open' position, occupies a narrower profile than the module of FIG. 1. The placement of the plenum 16 at the end of the module also assists in this regard.

Figure 12:
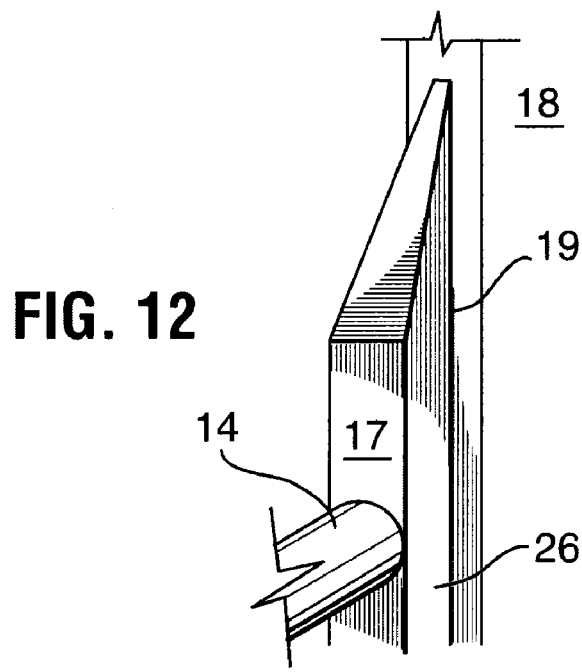
FIG. 12 is a perspective view of the alternate embodiment of the collapsible insulation panel module shown in FIG. 11, in open condition.
Figure 13:
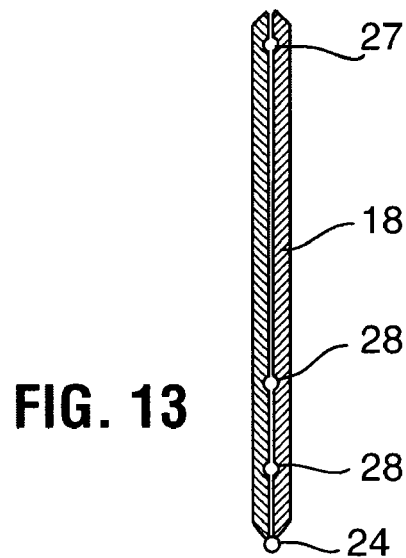
FIG. 13 is a cross sectional view of the alternate embodiment of the collapsible insulation panel module shown in FIG. 11, in open condition.
Figure 14:
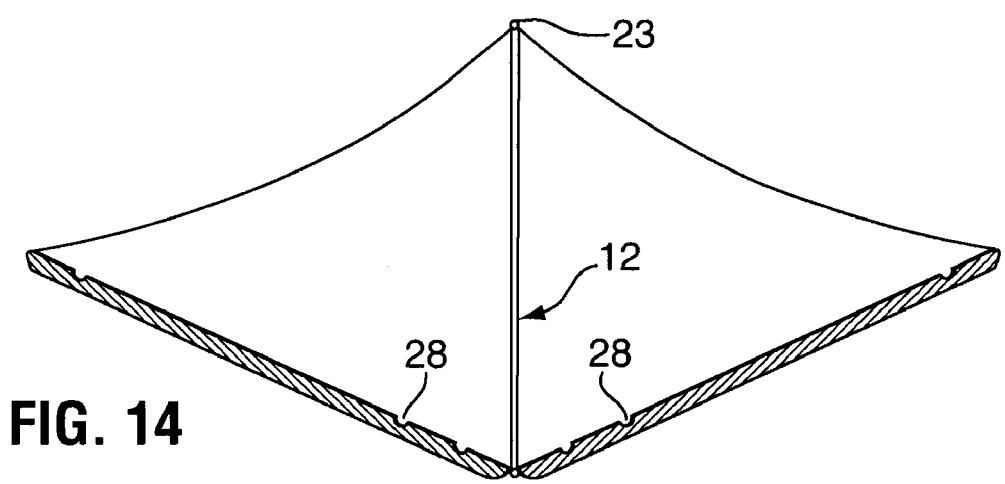
FIG. 14 is a cross sectional view of the alternate embodiment of the collapsible insulation panel module shown in FIG. 11, in closed condition.
Figure 15:
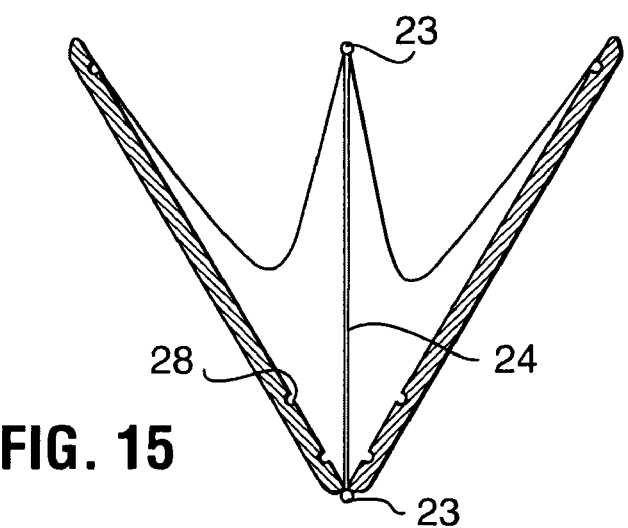
FIG. 15 is a cross sectional view of the alternate embodiment of the collapsible insulation panel module shown in FIG. 11, in partly open condition.

Secondly, using a standard sized truss structure as a central support, the module can be made of variable height, because, as is shown in, e.g. FIG. 12 or FIG. 13, the panels 18 can be made higher than the central support. Accordingly, fewer modules 1 can be used in a single installation, if desired.

It will be understood that in other respects of construction, the module 1 shown in FIGS. 11-15 is similar to that shown in FIGS. 1-10.

The invention claimed is:

1. An insulation system for installation in a greenhouse between a floor and a roof of the greenhouse for assisting in the control of air flow between a first space from the floor of the greenhouse to said insulation system and a second space from the insulation system to the roof of the greenhouse, the insulation system comprising:

at least a first insulation module and a second insulation module, each insulation module provided with a pair of panels, each of said panels of said pair of panels being hingedly coupled together along adjacent longitudinal edges, the insulation modules adapted to be mounted at a level defining an interior ceiling of the greenhouse and shiftable between an open position and a closed position, said longitudinal edges presenting a lowermost edge in a v-shaped pair of panels of each insulation module, wherein said insulation modules are arranged parallel to each other to define a ceiling structure, with upper edges of adjacent v-shaped pairs of panels abutting each other when said insulation modules are in the closed position; and shifting means to shift each said insulation module between the closed position and the open position, said shifting means being operably connected to each of said panels in said pair of panels, and operative to fold said panels together, wherein when said insulation modules are in the closed position, air below said insulation modules remains in said first space of said greenhouse below said insulation modules, and when said insulation modules are in the open position, air below said insulation modules can move to said second space in said greenhouse above said insulation modules, and wherein said means to shift each said insulation module from the closed position to the open position comprises a bellows formed by sealing substantially securely a gas tight membrane to edges of said panels in said pair of panels other than hinged-together edges of said pair of panels.

2. The insulation system of claim 1, further comprising a central supporting element between each of said panels.

3. The insulation system of claim 2, wherein said central support element is a central vertical panel or framework between said panels.

4. The insulation system of claim 3, wherein said panels are hingedly coupled to said central vertical panels or framework along the lower edges of said panels.

5. The insulation system of claim 4, wherein said panels or framework are coupled to said central vertical panel or framework by flexible wires, cables or the like limiting the angle to which said panels or framework can fall relative to the central support panel.

6. The insulation system of claim 2, wherein each insulation module further comprises a longitudinal plenum mounted over said central support panel or framework, adapted to permit air flow from said bellows.

7. The insulation system of claim 6, wherein said central support panel includes vertical corrugations, and wherein said plenum has a lower wall with a slot to accommodate said central support panel, whereby air flow to or from said plenum into or out of said bellows is via the corrugations of said central support panel, and said air flow is thereby substantially equally split between sides of said bellows.

8. The insulation system of claim 1, wherein said panels are made from a rigid framework incorporating an insulation material, surrounded by a perimeter frame of rigid material.

9. The insulation system of claim 1, wherein said panels include a reflective lower surface.

10. The insulation system of claim 8, wherein said insulation material is a foam insulation.

11. The insulation system of claim 10, wherein said insulation material comprises sheets of rigid foam insulation.

12. The insulation system of claim 8, wherein said framework is made from a material selected from the group consisting of plastics, aluminum, steel, fibreglass and wood.

13. The insulation system of claim 4, wherein said central support is a framework, and each insulation module further comprises a plenum at one end thereof, aligned with said framework, to permit air flow from an air duct into said bellows.

14. The insulation system of claim 13, wherein said panels of said insulation modules are rigid foam insulation panels which extend, in the open position of said insulation modules, to a level above a top edge of said framework.

15. The insulation system of claim 14, wherein said panels include longitudinal grooves on surfaces inside said insulation modules to assist in evacuating air from said bellows.

* * * * *